Sept. 2, 1958  R. J. KOPF  2,849,715
FASTENER SETTING TOOL
Filed Feb. 3, 1953  6 Sheets-Sheet 1
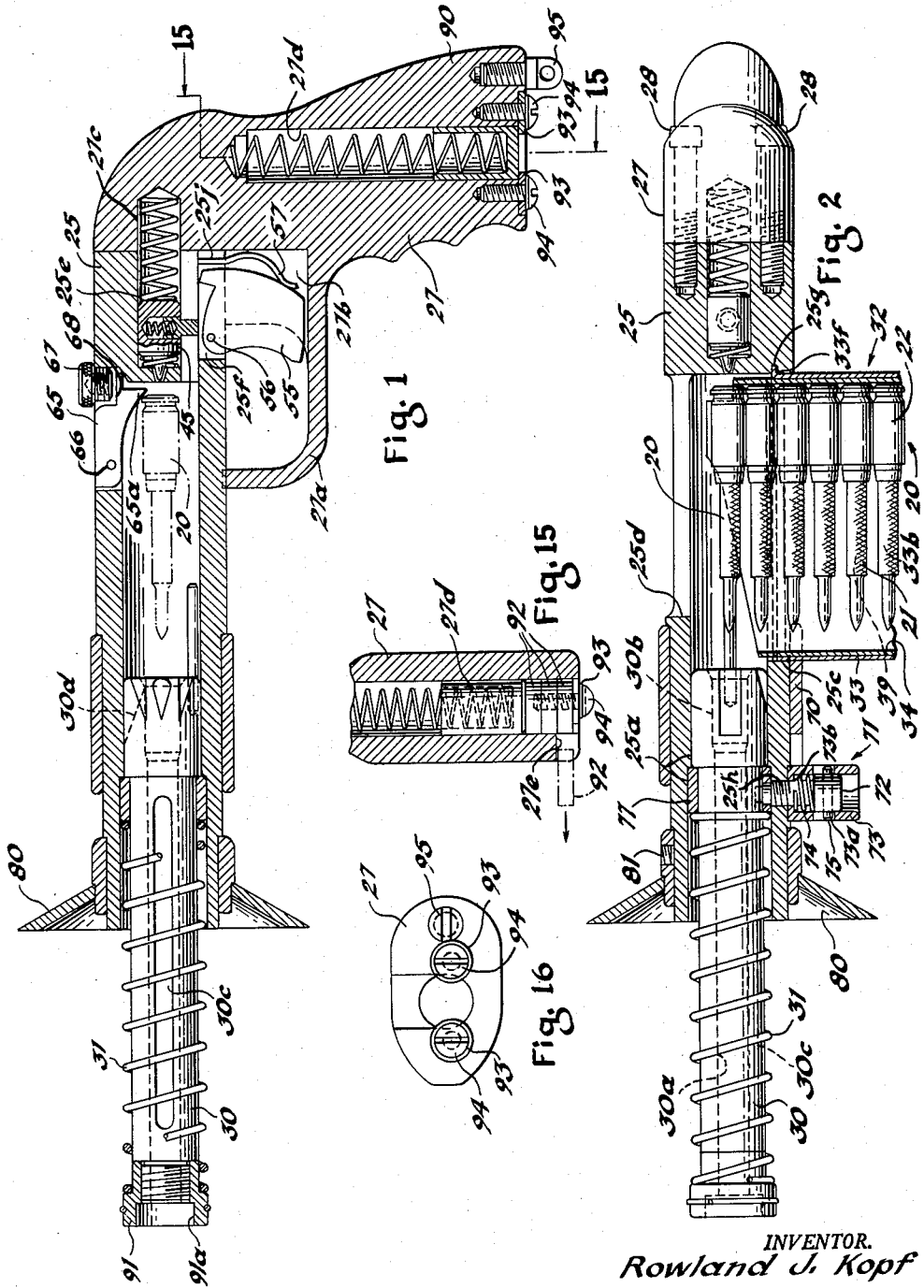
INVENTOR.
Rowland J. Kopf
BY
Hyde, Meyer, Baldwin & Doran
ATTORNEYS

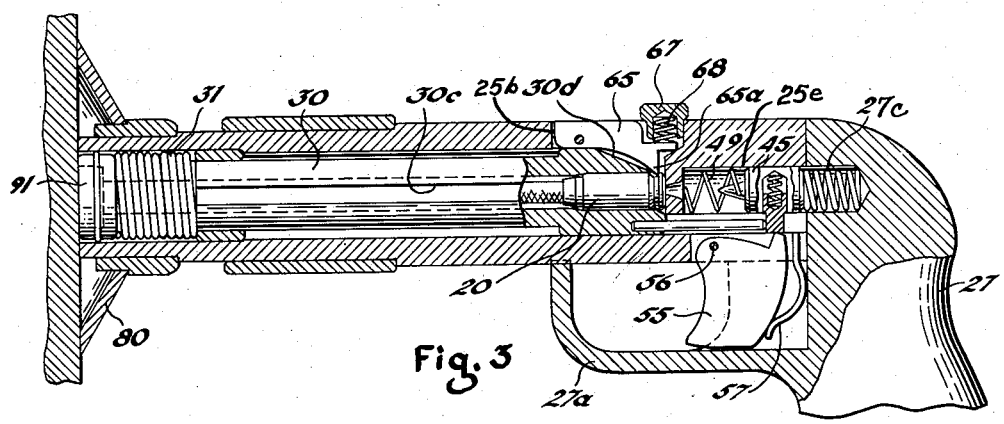
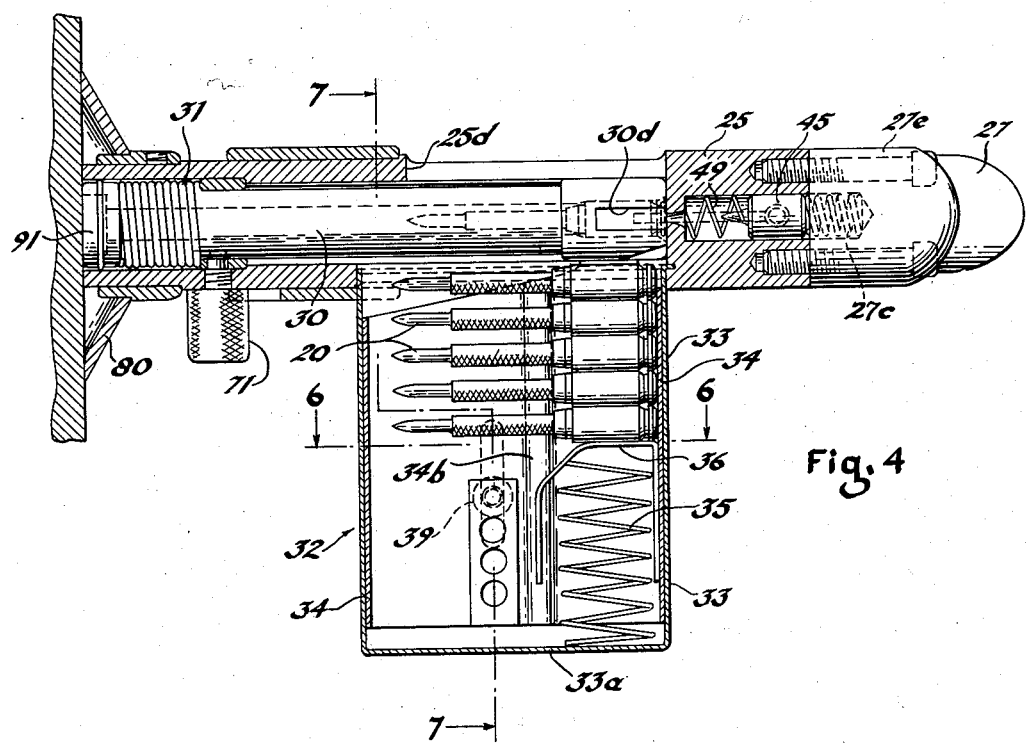

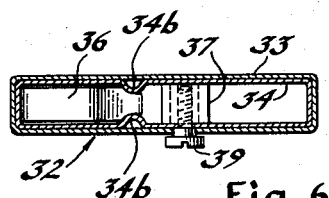
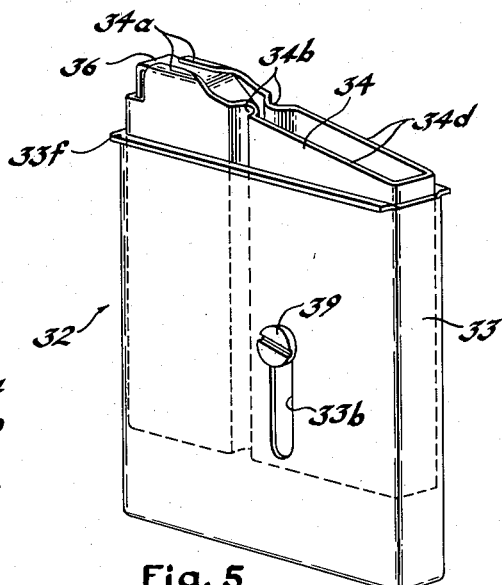
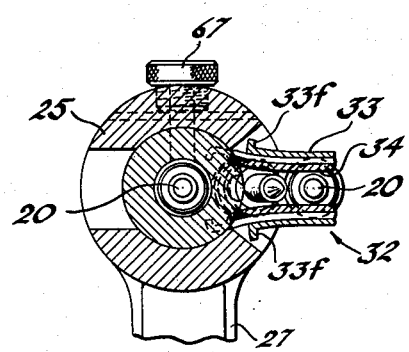
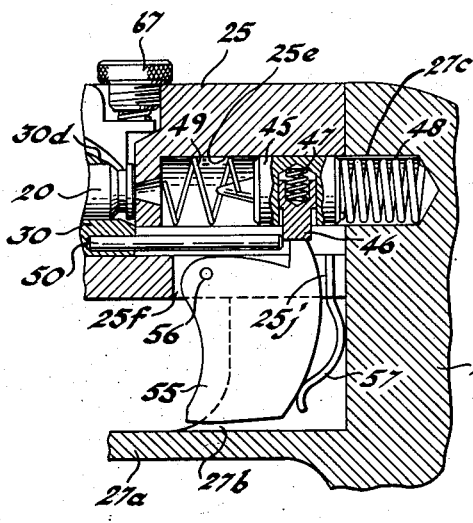
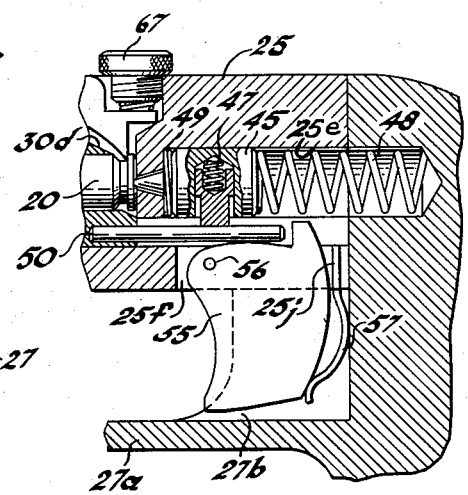

Sept. 2, 1958 R. J. KOPF 2,849,715
FASTENER SETTING TOOL
Filed Feb. 3, 1953 6 Sheets-Sheet 4
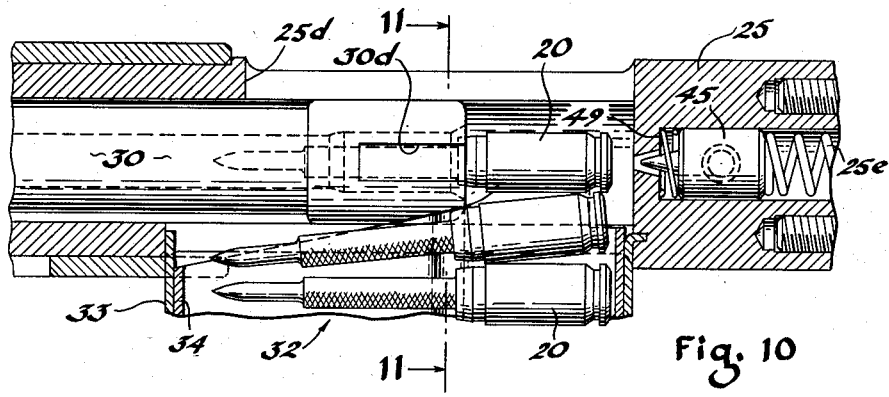
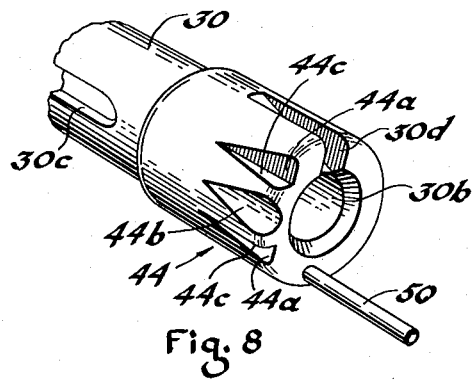
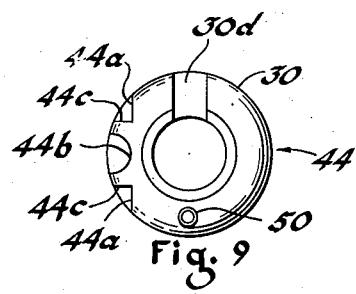
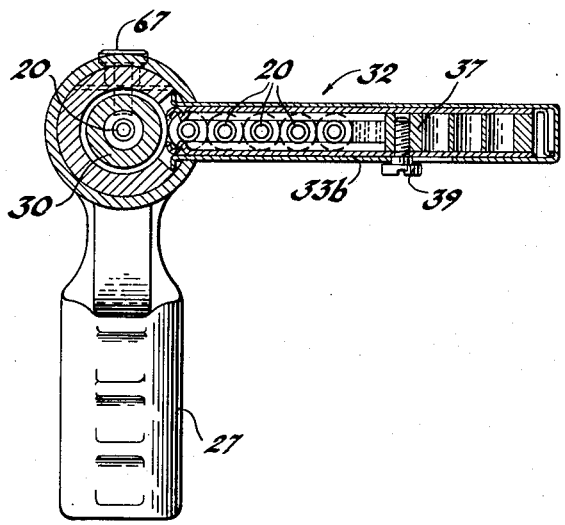
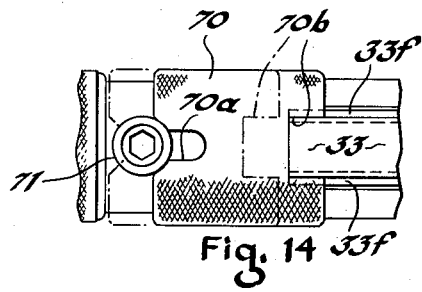
INVENTOR.
Rowland J. Kopf
BY
Hyde, Meyer, Baldwin & Doran
ATTORNEYS

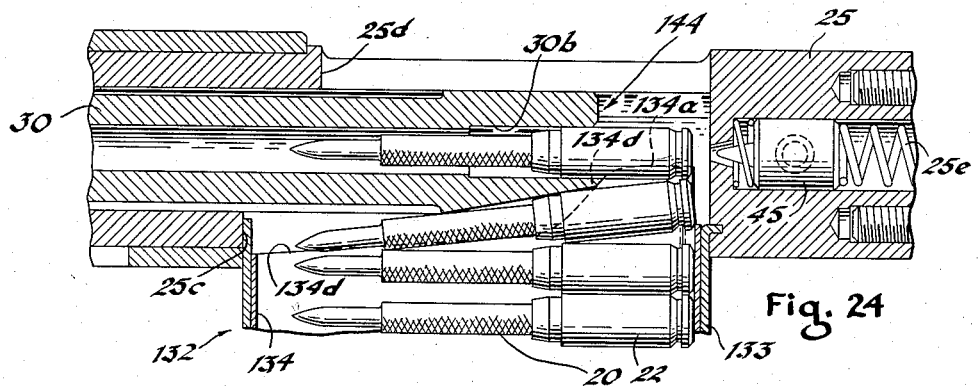
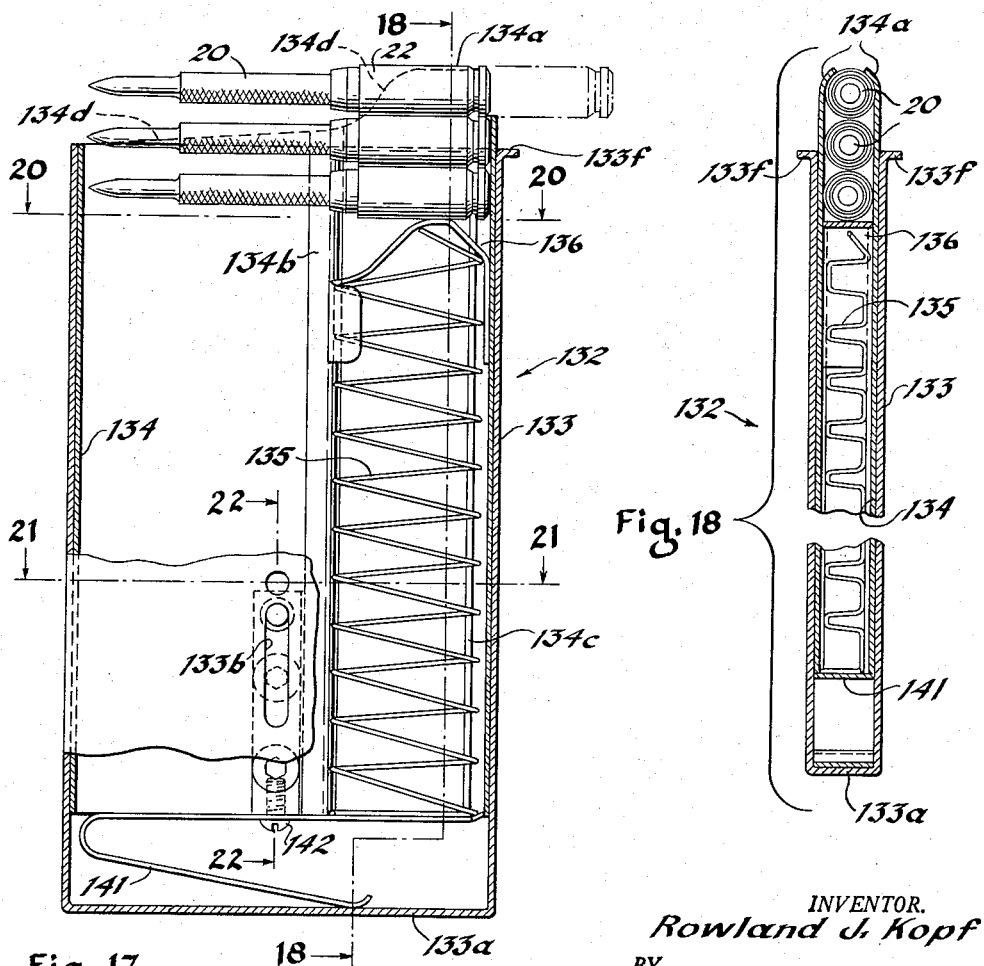

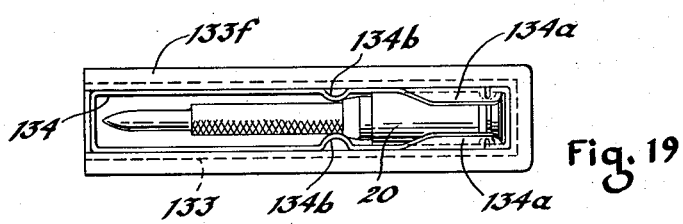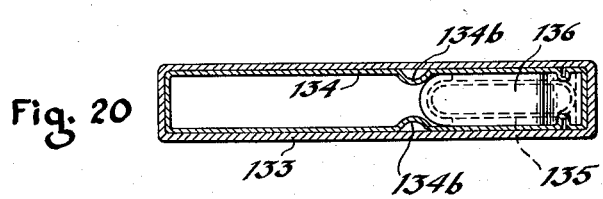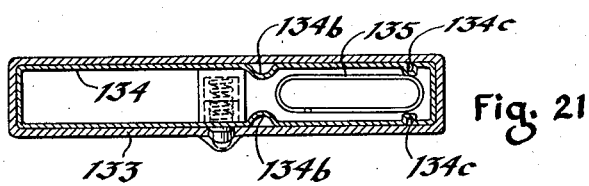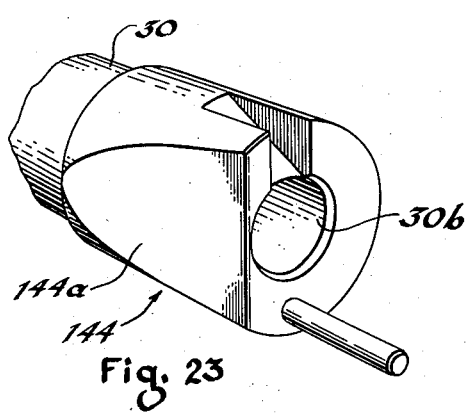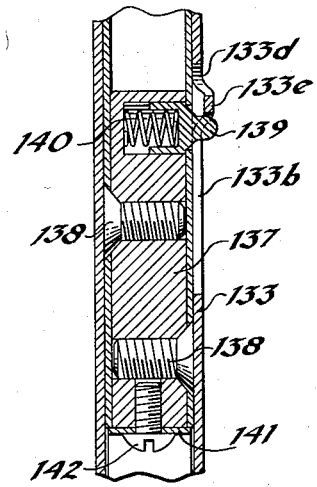

United States Patent Office 2,849,715
Patented Sept. 2, 1958

2,849,715

FASTENER SETTING TOOL

Rowland J. Kopf, Rocky River, Ohio, assignor, by mesne assignments, to Olin Mathieson Chemical Corporation, a corporation of Virginia Application February 3, 1953, Serial No. 334,817

21 Claims. (Cl. 1—106)

This invention relates to improvements in a powder actuated tool and more particularly to a fastener setting tool.

One of the objects of the present invention is to provide a powder actuated tool wherein the normal movement of the tool barrel while being pressed against and removed from the workpiece automatically feeds fastener units from a magazine into the chamber while cocking the firing pin; and after the fastener unit is fired, the tool automatically extracts and ejects the spent cartridge case from the barrel chamber to leave the breech open in a normal safety position.

A further object of the present invention is to provide a powder actuated tool characterized by its structural simplicity, the ease of assembly of its parts, its strong and sturdy nature, its operating efficiency, and its economy of manufacture.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a vertical longitudinal sectional view of the powder actuated fastener setting tool with the barrel shown in the normal, safety, extraction or ejection position;

Fig. 2 is a horizontal, longitudinal sectional view through the powder actuated fastener setting tool of Fig. 1;

Fig. 3 is a vertical longitudinal sectional view, similar to Fig. 1, showing the tool housing telescoped forwardly over the tool barrel when the barrel muzzle has been pressed against a workpiece so that the tool assumes the ready-to-fire or firing position with the ready-to-fire position shown in Fig. 3;

Fig. 4 is a horizontal, longitudinal sectional view, similar to Fig. 2, of the tool in the position shown in Fig. 3;

Fig. 5 is a perspective view of the magazine when unloaded and detached from the rest of the tool;

Fig. 6 is a sectional view taken through the magazine above the follower along the line 6—6 in Fig. 4;

Fig. 7 is a vertical transverse sectional view through the tool magazine, housing and barrel taken along the line 7—7 in Fig. 4;

Fig. 8 is a perspective view of the rear portion of the tool barrel, when removed from the tool, with the cam surface shown in detail that strips the lead fastener unit from the magazine during loading;

Fig. 9 is a rear end view of the barrel in Fig. 8 looking from the breech toward the muzzle;

Fig. 10 is a longitudinal horizontal sectional view of a portion of Figs. 2 and 4 but showing the barrel in an intermediate position between the two extreme positions in Figs. 2 and 4 during the stripping of the top or lead fastener unit from the magazine into the barrel chamber;

Fig. 11 is a vertical sectional view taken along the line 11—11 of Fig. 10 showing the loading or fastener unit feeding action in more detail with the magazine side walls spread an exaggerated amount for detail and emphasis;

Fig. 12 is an enlarged view of a portion of Fig. 3 disclosing how the firing pin is cocked as the tool housing telescopes forwardly toward the left over the barrel from the safety position in Fig. 1 to the ready-to-fire position in Fig. 3;

Fig. 13 is a view, similar to Fig. 12, showing the relationship of the parts after firing has taken place by depression of the trigger;

Fig. 14 is a bottom view of a portion of Fig. 2 ahead or to the left of the magazine showing the means for detachably securing the magazine to the remainder of the tool;

Fig. 15 is a vertical sectional view taken along the line 15—15 in Fig. 1 through a disk magazine in the tool hand grip;

Fig. 16 is a bottom view of the hand grip shown in Figs. 1 and 15 disclosing another view of the disk magazine mouth;

Fig. 17 is a side elevational view, partially in section, of a modified form of magazine that can be used with the tool in place of the first form of magazine disclosed in Figs. 2, 4, 5, 6, 7, 10 and 11;

Fig. 18 is a vertical sectional view through this modified form of magazine taken along the line 18—18 of Fig. 17;

Fig. 19 is a top view of the loaded modified form of magazine shown in Fig. 17;

Fig. 20 is a sectional view taken along the line 20—20 of Fig. 17 looking down on the follower in the modified form of magazine;

Fig. 21 is a sectional view taken along the line 21—21 of Fig. 17 through the magazine loading lock hole of the modified form of magazine;

Fig. 22 is a vertical sectional view taken along the line 22—22 of Fig. 17 through the loading lock hole and through the slot for controlling the telescopic position of the magazine box and tubular portion of the modified form of magazine;

Fig. 23 is a perspective view of a modified form of the cam surface in Fig. 8 on the rear end of a modified tool barrel for stripping the lead fastener unit during loading by coaction with the modified form of magazine in Fig. 17; while Fig. 24 is a longitudinal horizontal sectional view of the fastener setting tool with the modified form of magazine, shown in Figs. 17 to 22, coacting with the modified form of cam surface in Fig. 23 for stripping the lead fastener unit, shown in Fig. 23 to partially load a fastener unit into the barrel chamber in a manner generally similar to that shown in Fig. 10.

Before the powder actuated fastener setting tool here illustrated is specifically described, it is to be understood that the invention here involved is not limited to the structural details or arrangement of parts here shown since powder actuated tools embodying the present invention may take various forms. It also is to be understood that the phraseology or terminology herein employed is for purposes of description and not of limitation since the scope of the present invention is denoted by the appended claims.

This powder actuating fastener setting tool is specifically designed for automatically loading powder actuated fastener units one at a time from a magazine and then ejecting the spent cartridge case of the fastener units without manual assistance. A typical powder actuated fastener unit, shown generally at 20 in Fig. 2 consists of a fastener 21 removably secured in a cartridge case 22 by any suitable means. The fastener may be externally knurled for additional holding power, as shown in the drawings, and may have a pointed nose to permit the fastener to be driven or set satisfactorily into steel. The word "fastener," as shown at 21 and as used hereinafter, includes a pin, bolt, stud, screw, rivet or plug of the general type designed to be fired from a powder actuated tool into or through metal, concrete, masonry, etc.

The general operation of the tool will be described briefly. As the barrel muzzle engages a workpiece, the tool is pressed against the workpiece by the user as he holds the tool hand grip so that the tool parts move from the safety position shown in Figs. 1 and 2 to the ready-to-fire position shown in Figs. 3 and 4 by having the tool housing telescope forwardly over the barrel. This telescopic action strips the lead or topmost fastener unit in Fig. 2 from the magazine, as shown in Fig. 10, so that the fastener unit moves through the tool housing feed port into the barrel chamber to assume the position shown in Figs. 3 and 4. This telescopic movement also simultaneously cocks the firing pin by moving it to the ready-to-fire position shown in Figs. 3 and 12. This telescopic movement also causes the extractor to engage in the rim of the cartridge case, as shown in Figs. 3, 12 and 13. When the operator pulls the trigger, the firing pin strikes the cartridge case to explode the powder therein to propel the fastener through the barrel into the workpiece. As the tool is removed from the workpiece, the tool housing telescopes over the barrel from the firing position shown in Figs. 3 and 4 to the normal safety position shown in Figs. 1 and 2. This latter telescopic motion causes the extractor to firmly hold the spent cartridge case so that it moves with the housing away from the barrel chamber. After the spent cartridge has been extracted, the other fastener units in the magazine cause the spent cartridge case to be ejected through the ejection port as the following fastener unit moves up into alignment with the barrel bore to assume the position shown in Fig. 2. Since Fig. 2 is the normal position of the barrel in the tool, the breech is always left open for safety so that a fastener unit with its live cartridge case can never be left in the chamber.

The tool housing and hand grip will be first described in more detail with special reference to Figs. 1 and 2 of the drawings. The housing 25 has a tubular barrel recess 25a extending out the left end thereof merging at its right end into a feed port 25c and a diametrically oppositely aligned ejection port 25d with an extractor recess 25b cut into the top wall of the housing between the two ports. The right hand side of the housing has a firing pin recess connected to a trigger slot 25f at the lower side of the housing.

A hand grip 27 is provided for the operator to support the tool while firing. The grip 27 has integrally formed therewith a forwardly extending trigger guard portion 27a and has a vertical slot 27b, aligned with trigger slot 25f and extending rearwardly in the grip behind the trigger guard, for accommodating the trigger and a portion of its spring, as will be brought out in more detail hereinafter. The outer surface of housing 25 is cylindrical in configuration, and the portions of the grip 27 above the left end of trigger guard portion 27a and above slot 27b have arcuate surfaces of the same diameter to cradle the rear portion of the housing 25 therein. This grip may be joined to the housing by grip screws 28, 28 and, if necessary to prevent movement therebetween, by a tongue and groove joint in the mating surface between the grip and housing.

A barrel 30 is mounted in the barrel recess 25a for telescopic axial movement with respect to the housing 25 so that relative movement exists between the barrel and housing with these parts assuming either the position shown in Figs. 1 and 2 of the drawings or the positions shown in Figs. 3 and 4 or any intermediate position therebetween. The barrel 30 has a bore 30a extending longitudinally therethrough through which the fastener 21 is propelled, also referred to hereinafter as a passageway means having a passageway. The chamber 30b, provided at the breech end of the barrel, is coaxial with the axis of the bore and houses the complete powder actuated fastener unit 20 before discharge thereof, as shown in Fig. 3. A barrel driving spring 31, surrounding the barrel 30, keeps the barrel normally biased to the position shown in Figs. 1 and 2 spaced from and away from the ejector and firing pin in the housing 25. It is necessary to compress the spring to move the tool members to the position shown in Figs. 3 and 4.

The powder actuated fastener setting tool is provided with a magazine, generally shown at 32. This magazine is shown in assembled relationship with the rest of the tool in Figs. 2, 4, 7, 10 and 11 while it is specifically shown in detail in Figs. 5 and 6. The magazine 32 has an outer magazine box 33 for detachably holding the whole magazine in the feed port 25c of the tool. This box 33 has four side walls connected by a bottom wall 33a, as shown in Fig. 4. Telescopically mounted within the box 33 is a fastener unit feed means for forcing the fastener units into proper position for feeding and serving as a fastener unit retaining magazine. This feed means includes a tubular portion 34 for containing a plurality of fastener units therein biased toward its upper end, as shown in Fig. 4. A follower 36 (Figs. 4, 5 and 6), as well as the string of fastener units urged thereby, travels between and is guided by the front, back and right end walls in Fig. 4 and by opposing struck-up ribs 34b, 34b in Fig. 6. These ribs 34b, 34b also prevent subsequent jamming caused by forward dragging of the top fastener unit in the magazine by the barrel as it moves from the Fig. 4 to the Fig. 2 position, as will be more readily apparent as the description proceeds. This follower 36 is spring loaded by follower spring 35 in Fig. 4 to normally bias the cartridge cases 22 of the fastener units upwardly until the lead fastener unit cartridge case engages cartridge case retaining lip 34a, 34a that are inwardly bent as an integral part of the opposite side walls of the tubular portion 34.

This magazine 32, when disassembled from the rest of the fastener setting tool, is loaded in generally the same manner as any other type single-column magazine. The cartridge cases 22 of fastener units 20 are forced, back end first, one at a time toward the left in Fig. 5 down under the cartridge case retaining lips 34a, 34a in Fig. 5 by depressing follower 36 so that the cartridge cases 22 are fully held by the lips and are restrained against axial movement by the rear end wall (on the right in Fig. 4) of the magazine tubular portion 34 and by the opposed ribs 34b, 34b. The illustrated magazine in Fig. 4 is designed to hold six fastener units but it should be readily apparent that the magazine can be designed to hold any number of fastener units desired.

Means is provided for permitting relative telescopic movement of the tubular portion 34 relative to the surrounding magazine box 33 so that the lead fastener unit will be placed coaxial with the barrel bore when the parts are in the position shown in Fig. 2; so that the tubular portion 34 and the fastener units therein will be moved through the feed port back into the magazine box 33 away from the barrel bore as the barrel and housing move from the position in Fig. 2 through the position in Fig. 10 into the position in Fig. 4; and so the movement of the fastener units and the tubular portion 34 back to the Fig. 2 position, after the tool has been fired and then removed from the workpiece, will eject the extracted empty cartridge case through the ejection port 25d. As mentioned before, the tubular portion 34 telescopes within the magazine box 33 with a limited relative movement, and this limited relative movement takes place between two end stops determined by the ends of a slot 33b formed in the wall of magazine box 33. The tubular portion 34 has secured thereto a connecting wall 37 for maintaining the spacing between the opposite walls.

A shouldered screw 39 is threaded into a hole in this connecting wall 37 with the shoulder portion adapted to move in the slot 33b in Fig. 6 of the magazine box for limiting telescopic movement between the magazine box 33 and the tubular portion 34. This screw shoulder is so designed that when the screw is tightened in the connecting wall 37, the screw will not bind in the slot 33b but will permit a free telescopic movement between the parts. The follower spring 35 in Fig. 4 serves not only to urge the fastener units against the cartridge case retaining lips 34a, 34a but also to urge the shoulder of screw 39 against the upper end of slot 33b, as shown in Figs. 2 and 5, so that the lead fastener unit is aligned coaxially with the barrel bore when the barrel and housing assume the position shown in Fig. 2. The slot 33b is long enough so that the tubular portion 34 and the fastener unit therein can be depressed into the magazine box 33 when the housing has telescoped over the barrel into the ready-to-fire position in Figs. 3 and 4.

Cam means is provided on the rear end of the barrel, as shown in Figs. 8 and 9, for coacting with the upper surface of the magazine tubular portion 34 in Fig. 5 for stripping the lead fastener from magazine 32 into the barrel chambers 30b when the barrel 30 moves from the position shown in Figs. 1 and 2 to the position shown in Figs. 3 and 4. The coaction between these members is shown in more detail in Figs. 10 and 11 wherein the barrel is in an intermediate position between the positions shown in Figs. 2 and 4. The cam surface, generally shown at 44, is formed integral with the barrel 30 by cutting the proper camming grooves therein. These grooves in Fig. 8 consist of magazine depressor ramps 44a, 44a; a fastener nose depressor ramp 44b; and a cartridge case release wedge having wedging surfaces 44c, 44c. These wedge and grooves coact with cartridge case retaining lips 34a, cam surface 34d and cartridge case guide ribs 34b, 34b on magazine tubular portion 34 which ribs 34b also serve as cartridge case release ribs, as will be brought out hereinafter. The distance between the wedging surfaces 44c, 44c is approximately the same or less than the distance between the cartridge retaining lips 34a, 34a in Fig. 5 on the magazine tubular portion 34. However, this distance is greater than the distance between the ribs 34b, 34b for reasons that will be brought out hereinafter.

The operation of the magazine should be readily apparent. As mentioned before, the magazine 32, when in the tool and when the barrel and housing assume the position shown in Fig. 2, positions the lead fastener unit in coaxial alignment with the barrel bore since the spring 35 urges the tubular portion 34 into the proper position with the shouldered screw 39 engaging the upward end of the slot 33b in Figs. 2 and 5. This same spring 35 urges the fastener units in a single column string against the cartridge case retaining lips 34a, 34a so that they can be fed one at a time through the feed port 25c into the housing 25 and the barrel chamber 30b. As the housing 25 telescopes over the barrel 30 in moving from the position shown in Fig. 2 toward the position in Fig. 4 while carrying with it the magazine 32, the nose of the lead or topmost fastener unit 21 in Fig. 2 enters the barrel chamber 30b located ahead of said fastener unit. Simultaneously, the nose of the second highest fastener unit is forced back into the magazine 32 by the fastener nose depressor ramp 44b, as shown in Fig. 10. As the housing 25 continues to telescope forwardly towards the left over the barrel in Fig. 10, the topmost or lead fastener unit enters the barrel chamber 30b more fully. The magazine depressor ramps 44a, 44a have been climbing the inclined camming surfaces 34d, 34d on the tubular portion 34 forcing this tubular portion inwardly into the magazine box 33 against the bias of spring 35. Then, the cartridge release wedging surfaces 44c, 44c come against the cartridge release wedging ribs 34b, 34b on the magazine tubular portion 34 to force these ribs apart which in turn forces outwardly the sides of the magazine tubular portion 34 with the cartridge case retaining lips 34a, 34a. This action is so timed that the lead or topmost fastening unit in the magazine is thus freed just as the magazine depressor ramps 44a, 44a begin to force the magazine tubular portion 34 back into the magazine box 33 out of the path of the barrel as it moves toward the ready-to-fire and firing positions in Figs. 3, 4, 12 and 13.

Modified forms of a coacting magazine and cam surface are shown in Figs. 17 to 24. This magazine, shown at 132, has an outer magazine box 133 for detachably holding the whole magazine in the feed port 25c of the tool. This box 133 has four side walls connected by a bottom wall 133a, as shown in Fig. 17. Telescopically mounted with the box 133 is a fastener unit feed means for forcing the fastener units into proper position for feeding and serving as a fastener unit retaining magazine. This feed means includes a tubular portion 34 for containing a plurality of fastener units therein biased toward its upper end, as shown in Fig. 4. A follower 136 (Figs. 17, 18 and 20) travels between and is guided by the top, bottom, and right end walls in Fig. 21 and the opposing struck-up ribs 134b, 134b. This follower 136 is spring loaded by follower spring 135 in Figs. 17 and 21 to normally bias the cartridge cases 22 of the fastener units 20 upwardly until the lead fastener unit cartridge case engages the cartridge case retaining lip 134a, 134a that are inwardly bent as an integral part of the opposite walls of tubular portion 134. A channel is provided for slidably retaining the rims of the fastener unit cartridge cases and this channel is formed by struck-up rim guide ribs 134c, 134c in Figs. 19 and 21 cooperating with the right hand wall of the tubular portion 134. This channel aids in keeping the cartridge cases properly aligned for feeding into the barrel channel. This channel also prevents subsequent jamming caused by dragging forward the top fastener unit in the magazine when the barrel and housing move from a position similar to Fig. 4 to one similar to Fig. 2. The so-called "rimless" cartridge case is shown in the drawings with ribs 134c, 134c fitting in the groove therein but it should be thoroughly understood that the ribs could be used to retain a so-called "rim-type" cartridge case by engaging the front surface of the rims thereon.

Means is provided for permitting relative telescopic movement of the tubular portion 134 relative to the surrounding magazine box 133 so that the lead fastener unit will be placed coaxial with the barrel bore when the parts are in a position similar to that in Fig. 2; so that the tubular portion 134 and the fastener units therein will be moved through the feed port back into the magazine box 133 away from the barrel bore as the barrel and housing move from a position similar to that in Fig. 2 through the position in Fig. 24 and into a position similar to that in Fig. 4; and so that the movement of the fastener units and the tubular portion 134 back to a position similar to that in Fig. 2, after the tool has been fired and then removed from the workpiece, will eject the extracted empty cartridge case through the ejection port 25d. As mentioned before, the tubular portion 134 telescopes within the magazine box 133 with a limited relative movement, and this limited relative movement takes place between two end stops determined by the ends of a slot 133b formed in the wall of magazine box 133. The tubular portion 134 has a connecting wall 137 in Fig. 22 for maintaining the spacing between the opposite walls which wall is securely held in place by two screws 138, 138 having counter-sunk heads with the top of each screw head flush with the surface of the tubular portion 134. A spring loaded plunger 139 is mounted in a recess in this connecting wall 137 with spring 140 normally urging the shouldered head of plunger 139 into engagement with the slot 133b so that the tubular portion 134 can freely telescope within the box 133. In Fig. 17, a flat spring 141 is secured to the connecting wall 137 by a screw 142 to provide a bottom for the tubular portion 134 and for the follower spring 135 while also serving to resiliently urge the spring loaded plunger 139 against the upper end of slot 133b so that the lead or uppermost fastener unit in Fig. 17 in the tubular portion 134 is urged into a coaxial position with the barrel bore when mounted in the tool to assume a position similar to that shown in Fig. 2. The slot 133b is long enough so that the tubular portion 134 and the fastener unit therein can be depressed into the magazine box 133 when the housing has telescoped over the barrel into the ready-to-fire position.

The loading of the fastener units one at a time into the magazine 132 in Fig. 17, when disassembled from the rest of the fastener setting tool, will be described. Since the tubular portion 134 is normally permitted to telescope freely within the magazine box 133, it is desirable to lock it against relative movement during the loading operation. This is accomplished by moving the spring loaded plunger 139 into a magazine loading lock hole 133d in Fig. 22 by depressing it slightly until it can be moved along the connecting struck-up channel 133e and then the bias of spring 140 will force it into lock hole 133d. For ease in loading, the upper portion of the right wall of tubular portion 134 in Fig. 17, immediately below the cartridge case retaining lips 134a, is cut away so that each fastener unit can be slipped into the magazine, as shown by the dot-dash line position in Fig. 17, under the cartridge case retaining lips 134a one at a time through this cut-away portion with little effort, and the rim guide ribs 134c, 134c in Figs. 19 and 21 will easily snap into the groove ahead of the rim of the "rimless" type cartridge case used in the present disclosure. It should be noted that the rim, even on one of these so-called "rimless" type cartridge cases, is larger in diameter than the remaining portion of the cartridge case so that the use of this cut-away portion permits easier loading whether a "rimless" type or a "rim" type cartridge case is used.

A modified form of cam means is provided on the rear end of the barrel, as shown in Fig. 23, for coacting with the upper surface of the magazine tubular portion 134 in Fig. 17 for stripping the lead fastener from the modified magazine 132 into the barrel chambers 30b when the barrel 30 moves from a position similar to that shown in Figs. 1 and 2 to a position similar to that shown in Figs. 3 and 4. The coaction between these members is shown in more detail in Fig. 24 wherein the barrel is in an intermediate position between the two aforesaid positions. The cam surface, generally shown at 144 in Fig. 23, is formed integral with the barrel 30 by cutting the proper modified form of camming surface thereon. The cam surface 144 consists of a flat, bevelled magazine and fastener nose depressor ramp 144a that coacts with the cartridge case retaining lips 134a and the camming surface 134d on the top of the magazine tubular portion 134 for causing feeding of the fastener units one at a time into the barrel chamber.

The operation of the modified magazine in Figs. 17–24 should be readily apparent. As mentioned before, the magazine 132, when in the tool and when the barrel and housing assume a position similar to that shown in Fig. 2, positions the lead fastener unit in coaxial alignment with the barrel bore since the spring 141 urges the tubular portion 134 into the proper position with the spring loaded plunger 139 engaging the upward end of the slot 133b in Fig. 17. The spring 135 urges the fastener units in a single column string against the cartridge case retaining lips 134a, 134a so that they can be fed one at a time through the feed port 25c into the housing 25 and the barrel chamber 30b. As the housing 25 telescopes over the barrel 30, as shown in Fig. 24, in moving from a position similar to that shown in Fig. 2 towards a position similar to that in Fig. 4 while carrying with it the magazine 132, the nose of the lead or topmost fastener unit 21 in Fig. 24 enters the barrel chamber 30b located ahead of said fastener. Simultaneously, the nose of the second highest fastener unit is forced back into the magazine 132 by fastener nose depressor ramp 144a, as shown in Fig. 24. As the housing 25 continues to telescope forwardly towards the left over the barrel in Fig. 24, the topmost or lead fastener unit enters the barrel chamber 30b more fully. The magazine depressor ramp 144a has been climbing the inclined camming surfaces 134d, 134d on the tubular portion 134 forcing this tubular portion inwardly into the magazine box 133 against the bias of spring 141. In Fig. 24, the camming action of the flat ramp 144a presses against the camming surface 134d of the magazine tubular portion 134 and against the remaining fastener units in the magazine to exert sufficient force to pull or strip off the lead fastener unit out from under the cartridge case retaining lips 134a, 134a so that it can enter into the barrel chamber while depressing the remaining fastener units into the magazine 132 as the housing 25 moves forwardly over the barrel toward the ready-to-fire and firing positions.

Since the remainder of the tool is the same for both the Figs. 1 to 16 modification and the Figs. 17 to 24 modification, the remainder of the description will be generally confined to the former modification.

The tool has a firing pin assembly for striking the primer in the cartridge case 22 in the barrel chamber 30b which striking action in turn explodes the powder therein for driving the fastener units 21 through the barrel 30 into the workpiece. The firing pin assembly includes a firing pin 45 having a cone-shaped nose on the left thereof in Figs. 12 and 13 with a spring 48 urging the firing pin 45 to move toward the left to strike the primer in the cartridge case 22 during firing. The firing pin 45 and firing pin driving spring 48 are housed in aligned tubular recesses in the housing 25 and the grip 27 shown as recesses 25e and 27c. The left end of the firing pin recess 25e in the housing has a cone-shaped aperture through the housing wall, which wall serves as a breech block for the barrel chamber 30b, for permitting the firing pin tip to strike the primer.

Means is provided on the barrel 30 for engaging and cocking the firing pin 45 against the resilient bias of firing pin driving spring 48 as the housing moves with respect to the barrel from the normal safety position shown in Fig. 1 to the ready-to-fire position shown in Figs. 3 and 12. The firing pin loading pin 50 is secured to the rear of the barrel 30, as shown in Figs. 1 and 12, which pin during the telescoping movement of the barrel and housing engages a firing pin pawl 46 that normally extends a considerable distance downwardly from the firing pin 45 in the positions shown in Figs. 1 and 12. During the forward movement of the housing 25 over the barrel 30, firing pin pawl 46 is carried forwardly against the back end of firing pin loading pin 50 on the barrel. The forward movement of the firing pin 45 and the firing pin pawl 46, normally moving with the housing 25, is thus stopped. Continued forward movement of the housing 25 compresses the firing pin driving spring 48. As the tool is finally seated on the work in a position shown in Fig. 3, the rear of the cartridge case 22 engages the housing 25 so that the housing acts as a breech block for fully seating the fastener unit in the chamber 30b.

After the firing pin 45 has been moved back to the ready-to-fire position shown in Fig. 12, the trigger 55 can be squeezed by the tool operator for releasing the firing pin 45 from engagement with the firing pin loading pin 50 so that the firing pin driving spring 48 will drive the firing pin 45 forwardly toward the left to strike the primer in the cartridge case 22. The trigger 55 extends downwardly through a trigger slot 25f in the housing 25 and is pivotally mounted thereto on a pin 56 with a trigger sear projecting upwardly toward the firing pin pawl 46. As the trigger 55 is squeezed or pulled, it pivots around the pin 56 to depress the firing pin pawl 46 into a bore in the firing pin 45 in which it is reciprocally mounted by depressing the firing pin pawl spring 47 that normally biases pawl 46 to an outward position. As the trigger sear moves upwardly to move the firing pin pawl 46 out of contact with the firing pin loading pin 50, the firing pin driving spring 48 takes over to drive the firing pin 45 to the left from the ready-to-fire position shown in Fig. 12 to the firing position shown in Fig. 13.

The trigger 55 is normally held forwardly in the position shown in Fig. 12 so that the firing pin pawl 46 will clear the top of the trigger sear as the firing pin is being moved to the ready-to-fire position. A spring 57 normally biases the trigger 55 into the desired forward or ready-to-fire position. A rear view of the spring 57 in Fig. 1 is generally T-shape with the stem of the T loosely held in the slot 27b in grip 27 while engaging the back of trigger 55 to urge it forwardly (to the left in Fig. 1). The cross bar of the T extends across trigger slot 25f to be upwardly slidable into and detachably anchored in aligned slots 25j, extending perpendicular to the plane of the drawing in Fig. 1 and extending out from opposite sides of slot 25f into the housing. As the trigger is pulled, this spring 57 is compressed, as shown in Fig. 13, with the slot 27b providing clearance so that the trigger can move backwardly therein.

As the firing pin 45 moves forwardly to the firing position, a firing pin rebound spring 49 is compressed. After the firing pin has struck the primer to explode the powder charge, the rebound spring 49 moves the firing pin 45 to a slightly rearward safety position, as shown in Figs. 1 and 2, with the firing pin tip not projecting forwardly to the left out of the cone-shaped hole in the portion of the housing 25 forming the breech block engaging the cartridge case 22. If this tool should be accidentally dropped, the rebound spring 49 would prevent accidental discharge. Also, the firing pin does not project out to strike the primer of the fastener unit 20 being fed into the barrel chamber 30b during the loading operation in Fig. 10.

After said barrel 30 and housing 25 have reached the ready-to-fire position shown in Fig. 3, extractor 65 engages the rim of the cartridge case 22 by an extractor lip 65a for holding the cartridge case stationary relative to the housing 25 for extraction when the barrel and housing are moved from a position shown in Fig. 3 to that shown in Fig. 1. The extractor 65 extends through extractor recess 25b in the housing 25 while being pivoted on a pin 66 in Fig. 1. The extractor is resiliently biased by an extractor spring 68 in Fig. 1 contained in the bore of an extractor housing cap 67 threaded into the housing 25 for permitting the extractor lip 65a to snap over the rim into the groove of the cartridge case 22 as the lip extends downwardly in Fig. 3 into the extractor slot 30d (Figs. 3, 8 and 9) in the barrel.

Both magazines 32 and 132 are detachably secured to the rest of the tool by a magazine retainer, as shown in Figs. 2 and 14. The magazine 32 in Fig. 5 and the magazine 132 in Figs. 17 and 18 have respectively retaining flanges 33f and 133f formed integral with and extending outwardly from the magazine boxes 33 and 133 on three sides thereof including the rear side. Since both magazines are attached to the tool in the same manner, only the attachment of magazine 32 will be described. The portion of the flange 33f on the rear side, to the right in Fig. 2, is detachably engaged into retaining flange groove 25g in the housing while a magazine retainer sleeve 70 telescopes over the housing in the rearward direction toward the right in Fig. 14 so that its magazine box cut 70b straddles the magazine box 33 under the side retaining flanges 33f. A magazine retainer catch, generally shown at 71, engages the retainer sleeve 70 in cut 70a to prevent forward travel thereof. This retainer catch 71 includes a magazine retainer catch screw 72 in Fig. 2 threaded into a screw hole 25h in the housing by an Allen head type screw with a sunken wrench socket in the bottom thereof. A magazine retainer catch tube 73 surrounds the catch screw 72 and is spring loaded by a spring 74 normally biasing it to move upwardly toward the barrel 30 in Fig. 2 because spring 74 is held between an inwardly directed spring engaging shoulder 73b on tube 73 and the head of the catch screw 72. Axially extending diametrically opposite slots 73a are provided in the tube 73 through which travel the ends of a pin 75 driven through and secured in a diametrical hole in screw 72. The outer surface of the magazine retainer catch tube 73 can be knurled, if desired, so that it can be easily pulled downwardly or outwardly on catch screw 72 against the upward bias of the spring 74.

The attachment of the loaded magazine to the remainder of the tool should be readily apparent. The magazine retainer catch tube 73 is grasped in one hand and pulled away from the housing 25 against the bias of spring 74. While the catch tube is being held in this position, magazine retainer sleeve 70 is telescoped forwardly over the housing 25 to the dot-dash position in Fig. 14 so that the magazine retainer catch cut 70a, formed at the front thereof as a slot with a beveled mouth, straddles the magazine retainer catch screw 72. Then, the rear retaining flange 33f (on the right in Fig. 2) on the magazine is inserted into the retaining flange groove 25g in the housing. When this flange is fully engaged, the magazine is swung clockwise in Fig. 2 so that the retaining flange 33f on the opposite side walls of the magazine box 33 enter their seat in the feed port 25c. The magazine retainer sleeve 70 should then be telescoped to the rear over the housing 25 so that the magazine box cut 70b straddles the front end of the magazine box 33 to securely hold the retaining flange portions 33f on each side of the magazine box in their seat. The magazine retainer sleeve 70 should be pulled to the rear until the magazine retainer tube 73 has snapped into the beveled portion of the magazine retainer catch cut 70a to assume the position shown by the solid lines in Fig. 14. The magazine 32, when empty, is removed from the remainder of the tool by reversing the above steps.

The magazine retainer catch, generally shown at 71, has another function in addition to the one described for detachably holding the magazine to the rest of the tool. The end of the magazine catch screw 72 extends through a hole in the barrel retainer ring 77 in Fig. 2 into a race or groove 30c extending longitudinally along the barrel 30, as shown in Figs. 1 and 2. The screw 72 securely locks the barrel retainer ring 77 within the housing 25 to prevent either accidental or unauthorized intentional disassociation of barrel 30 from housing 25. The end of the screw 72 in the groove 30c prevents relative rotation between the barrel 30 and the housing 25 so that the cam surface, shown in Figs. 8 or 23, on the barrel will always be properly aligned with its coacting surface on the top of the magazine in Fig. 5. The end of the catch screw 72, lying in the groove 30c, limits the relative longitudinal movement between the barrel 30 and the housing 25 by lying in the path of travel of the limit stops formed by the opposite longitudinal ends of the groove to define the maximum travel of the barrel with respect to the housing. The end of catch screw 72 in groove 30c in Fig. 2 also prevents travel of the barrel 30 under the resilient bias of spring 31 beyond the position in Figs. 1 and 2.

The front of the housing 25 has a flash shield 80 telescoped over it and secured in place by a flash shield retaining screw 81. This flash shield is one of any of the conventional types for preventing richochets and shattered material flying backwardly from the workpiece, in Figs. 3 and 4, to injure the tool operator.

When the fastener 21 is fired into soft material or thin steel, a disk 92 should be used. This disk is placed into a disk adaptor counterbore 91a of a muzzle cap 91 screwed onto the end of barrel 30. The disk adaptor counterbore is larger than but concentric with the barrel bore 30a for receiving a disk. As the fastener 21 is propelled through the barrel, it penetrates this disk in the adaptor and carries it along to the workpiece where the disk engages the surface of the workpiece to expend some of the kinetic energy of the fastener to limit the penetration.

It should be noted in Figs. 1 to 4 inclusive of the drawings that the barrel spring 31, normally biasing the barrel to assume the position shown in Figs. 1 and 2, is restrained between the muzzle cap 91 and the barrel retainer ring 77 to perform this function.

Spare disks 92 are held in a disk magazine 90 in Figs. 1, 15, and 16 in the hand grip 27. This magazine feeds disks one at a time out of the bottom of the magazine for loading into the counterbore 91a of the muzzle cap. A bore 27d, having a slightly larger diameter than a disk 92, extends upwardly into the hand grip from the bottom thereof with a slot 27e, slightly wider and thicker than a single disk 92, being formed in communication with the bottom of the bore in one side of the bottom of the hand grip. Circular cover disks 93, 93 are each secured by one of the screws 94, 94 to the bottom of the hand grip 27 to partially cover the bore 27d and said slot 27e so that the bottom disk 92 can be engaged by the operator with his fingers and pulled outwardly through slot 27e in the direction of the arrow in Fig. 15, to the dot-dash position shown therein, for loading in the disk adaptor counterbore 91a.

An eye 95 can be attached to the bottom of the hand grip, if desired, for detachable securement of a lanyard to prevent loss of the tool.

The operation of the tool should now be apparent. In review, it should be noted that the housing 25 and barrel 30 have two positions, first a normal position shown in Figs. 1 and 2 when the barrel is forwardly extended under the bias of spring 31 to provide a safety, ejection or extraction position. Also, it should be noted that the barrel and housing are urged toward the first or Fig. 1 position into a safe position by spring 48 in Fig. 12 pressing pawl 46 against pin 50. Second, the position in Figs. 3 and 4, wherein the housing engages the rear of the cartridge case to serve as a breech block for the barrel chamber and to provide a ready-to-fire or firing position. The first and second positions are spaced apart at least the length of a fastener unit 20 so that feeding may readily take place from the magazine, either 32 or 132.

The tool operator must first determine the exact point where the fastener is to be set into the workpiece before applying the barrel muzzle to the workpiece. Once the tool is depressed onto the workpiece, as shown in Figs. 3 and 4, it must be fired before being withdrawn; otherwise the unfired fastener unit 20 will be automatically extracted, and ejected. Before the tool is applied against the workpiece, the magazine tubular portion, either 34 or 134, and column of fastener units 20 move relative to the housing 25 so that the lead or topmost fastener unit 20 under the respective magazine retainer lips, either 34a or 134a, is axially aligned with the bore of the barrel 30 since magazine spring, either 35 or 141, has urged either magazine screw 39 or plunger head 139 against the end of the slot, either 33b or 133b, in the magazine box, either 33 or 133. As the tool is applied to the workpiece and pressure is exerted against it, the barrel 30 is forced into the barrel recess 25a of the housing to compress the barrel driving spring 31 between the barrel cap 91 and the barrel retainer ring 77, which abuts an internal shoulder in the housing 25 and is further secured by the shank of the magazine retainer catch screw 72 which passes through the magazine retainer catch screw holes in the barrel retainer ring 77 and enters the slot or race 30c in the barrel to align the barrel 30 radially with the housing. After the tool operator applies the muzzle of barrel 30 to the workpiece at the desired point, he presses the tool against the workpiece in a smooth, even stroke at a moderate speed. It should be apparent that the trigger 55 should not be pressed during this movement. If the trigger is held back, the tool cannot be fully applied to the workpiece, and, if this practice is continued, damage or distortion to the tool parts may result in time.

As the housing 25 slides over the barrel 30, carrying with it the magazine, either 32 or 132, the nose of the lead fastener unit enters the barrel chambers 30b. Simultaneously, the nose of the second fastener is forced back into the magazine, either 32 or 132, by the fastener nose depressor ramp, either 44b or 144a, on the barrel in either Fig. 8 or Fig. 23. As the housing continues to move forwardly, the fastener unit enters the barrel chamber more fully, as shown in either Figs. 10 and 11 or Fig. 24. In the magazine and cam surface in Figs. 1–16 the cartridge release wedging ribs 34b, 34b in the magazine come against the cartridge release wedging surfaces 44c, 44c on the barrel in Fig. 8 which force the ribs apart to thus force outwardly the sides of the magazine tubular portion 34 and the cartridge retaining lips 34a, 34a. This action is so timed that the first fastener unit in the magazine in Figs. 1–16 is thus freed just as the magazine depressor ramps 44a, 44a begin to force the magazine tubular portion 34 back into the magazine box 33 out of the path of the barrel 30. The breech block wall portion of housing 25 behind the cartridge case causes the fastener unit to be fully driven into the barrel chamber 30b as the barrel and housing reach the position shown in Figs. 3 and 4. In the magazine and cam surface in Figs. 17–24, ramp 144a serves as the magazine depressor ramp while acting on magazine cam surface 134d to strip the lead fastener from the magazine.

Also, during the forward movement of the housing 25 over the barrel 30, the firing pin pawl 46 in Fig. 12 is carried forwardly against the firing pin loading pin 50 secured to the barrel 30. Forward movement of the firing pin 45 with its pawl 46, accompanying the housing 25, is thus stopped. Continued forward movement of the housing 25 compresses the firing pin driving spring 48. As the tool is finally seated on the workpiece, the breech block wall of the housing 25 engages the back of the cartridge case 22 to fully seat the fastener unit in the barrel chamber 30b. The housing 25 has carried the trigger 55 forwardly with it so that the tail or sear of the trigger registers with the firing pin pawl 46 in the fully cocked or ready-to-fire position, as shown in Fig. 12.

Pressure on the trigger 55 lifts the pawl 46 by compressing spring 47 so that the pawl 46 is pushed upwardly until it is free of the firing pin loading pin 50. Then, the compressed firing pin driving spring 48 drives the firing pin 45 forwardly against the primer of the cartridge to the firing position shown in Fig. 13. The momentum of the firing pin 45 enables it during the last stages of this forward movement to compress the firing pin rebound spring 49 which, as soon as the firing pin 45 has expended its energy against the primer of the cartridge case 22, asserts itself and withdraws the firing pin slightly from the firing position to a safety position shown in Figs. 1 and 2. As the fastener unit 20 is fully seated in the barrel chamber 30b, the extraction groove of the cartridge case 22 is engaged by the extractor lip 65a.

After the tool is fired, it is withdrawn quickly from the workpiece. This quick or rapid removal of the tool from the workpiece aids in the extraction and ejection. The barrel driving spring 31 forces the barrel muzzle to remain against the workpiece as the housing 25 is pulled away. The extractor 65, attached to the housing 25, withdraws the expended cartridge case 20 from the chamber, and the inwardly moving magazine tubular portion under the bias of the magazine spring, either 35 or 141, causes the fastener unit column and magazine tubular portion, either 34 or 134, to strike the expended case for ejecting it through the ejection port 25d. This action also brings a new top or lead fastener unit into position in alignment with the bore of the barrel as shown in Fig. 2. The rearwardly moving housing 25 carries with it the firing pin 45 with its pawl 46. As soon as the firing pin pawl 46 clears the end of the firing pin loading pin 50, it is forced by the firing pin pawl spring 47 back into the path of the firing pin loading pin 50.

This tool has several safety features in addition to those mentioned. First, barrel driving spring 31 keeps the barrel 30 in the forward position shown in Figs. 1 and 2 so that the tool can never be left with a cartridge or fastener unit in the barrel chamber 30b. Second, in the event that the tool is dropped on the barrel 30, the firing pin loading pin 50 will withdraw the firing pin 45 to thus prevent accidental discharge of the tool. Third, the tool must be fully seated against the work piece with the barrel 30 extending approximately perpendicular to the work piece surface as shown in Figs. 3 and 4, before the tool can be fired. Fourth, a partial stroke or incomplete firing cycle will result in the ejection of a loaded fastener unit. The operator must withdraw the tool fully from the workpiece after firing before he can fire again, and must not, while preparing to fire, force the tool onto the workpiece and then partially withdraw it. A slight withdrawal will result in a misfire, while more nearly complete withdrawal may result in a double feed or a jammed fastener unit. A jammed fastener unit may be easily cleared by withdrawing the tool fully from the workpiece and shaking the fastener out of the ejection port.

Various changes in details and arrangement of parts can be made by one skilled in the art without departing from the spirit of this invention or the scope of the appended claims.

What I claim is:

1. A powder actuated tool for driving a fastener into a workpiece, comprising a housing member having a feed port, a barrel member having a bore with a coaxial chamber for receiving a powder actuated fastener unit comprising a joined cartridge case and fastener, workpiece abutment means movable with said barrel and engageable with the workpiece, said barrel member and housing member being mounted for axial relative movement between a first position and a firing second position wherein a portion of said housing member serves as the breech block for said chamber, means biasing said members toward said first position, a magazine on said housing member, and means for advancing the fastener units in a string one at a time from said magazine through said feed port into said barrel chamber by movement of at least one of said members between said positions caused by pressing said abutment means against said workpiece with the lead unit moving into the barrel chamber during movement from the normal first to said second position.

2. A powder actuated tool comprising a housing member having a resiliently biased firing pin and an extractor, said housing member having a feed port and an ejection port, a barrel member having a bore with a coaxial chamber for receiving a powder actuated fastener unit comprising a joined cartridge case and fastener, said firing pin and said barrel member and housing member being mounted for axial relative movement between a normal first position and a ready-to-fire or firing second position wherein said housing member serves as the breech block for said chamber, said barrel member in said first position being spaced from while in said second position being adjacent said firing pin and extractor, a magazine on said housing member for advancing the fastener units in a string one at a time through said feed port into said housing member with the lead fastener unit being in line with the axis of said chamber when said members are in said first position, said barrel member and chamber being ahead of said lead fastener unit when said members are in said first position so that the lead fastener unit is stripped from said magazine into said chamber, means for cocking said firing pin against its resilient bias as one of said members moves between said first and second positions, manual means for releasing said firing pin from the ready-to-fire position so that its resilient bias will carry it to the firing position for firing said cartridge and propelling said fastener through said barrel member when said members are in said second position, said extractor engaging said cartridge case for holding said cartridge case stationary relative to said housing member for extraction when at least one of said members is moved from said second position to said first position with the advancing string of fastener units in said magazine forcing the spent cartridge case to eject through said ejection port.

3. A powder actuated tool comprising a housing member having a feed port and an ejection port opposite each other, a barrel member having a bore with a coaxial chamber for receiving a powder actuated fastener unit comprising a joined cartridge case and fastener, said barrel member and housing member being mounted for axial relative movement between an ejection normal first position and a firing second position wherein said housing member serves as the breech block for said chamber, corresponding portions on said members in said first and second positions being spaced apart at least the length of a cartridge case, means resiliently biasing said members toward said first position, a magazine comprising unit retaining stop lip means and a body mounted for relative movement generally normal to the axial relative movement of said members, said magazine body being fixed to said housing member, resilient biasing means for advancing the fastener units in a string one at a time through said feed port into said housing member with the lead fastener unit being biased against said lip means in line with the axis of said chamber when said members are in said first position and for permitting movement of said lip means against said biasing means by said barrel to a position laterally of said chamber during movement from said first to second positions, said barrel member and chamber being ahead of said lead fastener unit when said members are in said first position, and an extractor operatively connected to said housing and engaging said cartridge case for holding said cartridge case stationary relative to said housing for extraction when at least one of said members moves from said second position to said first position by their resilient bias, said resilient biasing means in said magazine ejecting the spent cartridge case through said ejection port by resiliently urging the next fastener unit into the lead position.

4. A powder actuated tool comprising a barrel member, a housing member having a firing pin resiliently biased to move toward said barrel member, a resiliently biased extractor, means operatively connecting said housing member and extractor together, said housing member having a feed port and an ejection port, said barrel member having a bore with a coaxial chamber for receiving a powder actuated fastener unit comprising a joined cartridge case and fastener, said barrel member and housing member being mounted for axial relative movement between a safety, ejection or extraction normal first position and a ready-to-fire or firing second position wherein said housing member serves as the breech block for said chamber, said barrel member in said first position being spaced from while in said second position being adjacent said firing pin and extractor, said first and second positions being spaced apart at least the length of a fastener unit, means resiliently biasing said barrel member and firing pin and extractor toward said first position, a magazine removably fixed to said housing for advancing by resilient biasing means the fastener units in a string one at a time through said feed port into said housing member with means provided so that the lead fastener unit will be in line with the axis of said chamber when said barrel member is in said first position, said barrel member and chamber being ahead of said lead fastener unit when said members are in said first position, means on said barrel for engaging and cocking said firing pin against said resilient bias as at least one of said members moves from said first to said second positions, means on said barrel for stripping the lead fastener unit from said magazine into said chamber as at least one of said members moves between said first and second positions, and manual means for releasing said firing pin from said cocking means for firing said cartridge and propelling said fastener through said barrel member when said members are in said second position, said extractor engaging said cartridge case for holding said cartridge case stationary relative to said housing member for extraction when at least one of said members moves from said second position to said first position by its resilient bias, said resilient biasing means in said magazine ejecting the spent cartridge case through said ejection port by resiliently urging the next fastener unit into the lead position.

5. A powder actuated tool comprising a housing, a barrel, means operatively securing said barrel to said housing so that said barrel projects outwardly from the front thereof, a hand grip, means detachably securing said hand grip to the rear of said housing, a means for firing a powder actuated fastener through said barrel, said means being located in said housing and hand grip and including a resiliently biased firing pin housed in aligned bores in said hand grip and housing with the means providing the resilient bias located at least a portion of the time in both bores.

6. In a powder actuated tool, a housing member having a feed port, a barrel member, said members being telescopically connected together for relative movement and having end limit stops thereon, a slidable magazine retainer member cooperating with said feed port and adapted to cooperate with a magazine to hold said magazine in alignment therewith, and a catch means on said housing member for engaging said magazine retainer member with said catch means lying in the path of travel between said limit stops.

7. In a powder actuated tool, a housing member having a feed port, a barrel member, said members being telescopically connected together for relative movement, said barrel member having a longitudinally extending groove for providing end limit stops thereon, a slidable magazine retainer member cooperating with said feed port and adapted to cooperate with a magazine to hold said magazine in alignment therewith, and a catch means on said housing member for engaging said magazine retainer member with said catch means lying in the path of travel in said groove between said barrel member limit stops for preventing relative rotation between said members.

8. A powder actuated tool comprising a housing, a barrel, means operatively securing said barrel to said housing with said barrel projecting outwardly from the front thereof, a hand grip, means detachably securing said hand grip to the rear of said housing, means for firing a powder actuated fastener through said barrel by an operator grasping said hand grip, said means including a trigger pivotally mounted to said housing in and extending downwardly through a slot in said housing and rearwardly through a slot in said hand grip when the tool barrel is pointed horizontally away from the tool operator, a resilient means in one of said slots urging said trigger forwardly away from said hand grip to a ready-to-fire position.

9. An explosively actuated fastener driving tool, comprising passageway means having a passageway through which fasteners are to be driven into a workpiece, a breech block means to serve as a closure for the breech end of said passageway means and a breech housing bounded on one side by said breech block means, a workpiece engaging means operatively associated with said passageway means and having a workpiece engageable portion at the muzzle end of said tool, said breech block means and workpiece engaging means being mounted for relative axial movement, resilient means urging said portion of said workpiece engaging means away from said breech block means, a finger extending parallel to the direction of fastener travel and operatively associated with the breech end of the workpiece engaging means, said finger projecting into operative association with said breech block means, a firing pin reciprocably mounted in said breech housing, a firing pin spring engaged between said housing and the firing pin urging the firing pin to move toward said passageway means, means to cock said firing pin comprising a cocking element operatively associated with said firing pin and finger for releasably engaging in operative connection said finger and said firing pin to releasably hold said firing pin in a fixed position relative to the workpiece against the urging of the firing pin spring when the tool is manually advanced toward said workpiece, and manually operable disconnecting means mounted on said breech housing and operable to release said cocking element from operative holding connection of said finger and said firing pin.

10. A tool as described in claim 9, said disconnecting means comprising a lever pivotally mounted on said housing whereby an end thereof is engageable with said cocking element and describes an arcuate path, said arcuate path aligning with and permitting engagement of said end with said cocking element to release said cocking element only when said firing pin is in a substantially full cocked position.

11. A tool as described in claim 10, said cocking element being a plunger slidably mounted in said firing pin and spring-urged to project outwardly therefrom into alignment for operative engagement with the finger during at least a portion of said relative axial movement.

12. A powder actuated tool, comprising a housing having a hand grip secured thereto, a barrel member having a breech, a firing pin member operatively associated with said housing and resiliently biased toward said barrel member for movement between cocked and fired positions relative to said housing located respectively remote from and adjacent said breech, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction, and manually actuatable means pivoted to said housing and manually movable relative to said hand grip for moving said latching means to non-aligned position in firing pin cocked position for firing said tool by permitting said resilient bias of said firing pin to move said firing pin from cocked to fired position.

13. A powder actuated tool, comprising a housing having a hand grip secured thereto, a barrel member having a breech, a firing pin member operatively associated with said housing and resiliently biased toward said barrel member for movement between cocked and fired positions relative to said housing located respectively remote from and adjacent said breech, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction, and manually actuable means pivoted to said housing about an axis extending generally transverse to the direction of said relative axial movement and manually movable relative to said hand grip for moving said latching means to non-aligned position in firing pin cocked position for firing said tool by permitting said resilient bias of said firing pin to move said firing pin from cocked to fired position.

14. A powder actuated tool, comprising a housing, a barrel member having a breech, a firing pin member operatively associated with said housing and resiliently biased toward said barrel member for movement between cocked and fired positions relative to said housing located respectively remote from and adjacent said breech, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction, and manually actuatable means pivoted to said housing about an axis extending generally transverse to the direction of said relative axial movement for moving said latching means to non-aligned position in firing pin cocked position for firing said tool by permitting said resilient bias of said firing pin to move said firing pin from cocked to fired position.

15. A powder actuated tool, comprising a housing, a barrel member having a breech, a firing pin member operatively associated with said housing and resiliently biased toward said barrel member for movement between cocked and fired positions relative to said housing located respectively remote from and adjacent said breech, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction, and manually actuatable means operatively associated with said housing for moving said latching means to non-aligned position in firing pin cocked position for firing said tool by permitting said resilient bias of said firing pin to move said firing pin from cocked to fired position, said latching means including a slidable element reciprocably mounted in said one member for movement between aligned and non-aligned positions.

16. A powder actuated tool, comprising a housing, a barrel member having a breech, a firing pin member operatively associated with said housing and resiliently biased toward said barrel member for movement between cocked and fired positions relative to said housing located respectively remote from and adjacent said breech, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction, and manually actuatable means operatively associated with said housing for moving said latching means to non-aligned position in firing pin cocked position for firing said tool by permitting said resilient bias of said firing pin to move said firing pin from cocked to fired position, said latching means including an element mounted in said one member for movement between aligned and non-aligned positions and including a helical spring biasing said element to aligned position.

17. A powder actuated tool, comprising a housing having a hand grip secured thereto, a barrel member having a breech and a muzzle, a firing pin member operatively associated with said housing and resiliently biased toward said barrel member for movement between cocked and fired positions relative to said housing located respectively remote from and adjacent said breech, at least the powder firing portion of said firing pin being located in said housing, said resilient bias being provided by a helical spring with opposite ends bearing against said firing pin and a bore end wall in the hand grip of said tool, latching means carried by one of said members and movable between aligned and non-aligned positions with a portion of the other of said members, said barrel member and firing pin member and housing being operatively connected for axial relative movement with said barrel member arranged to cock said firing pin to cocked position with said latching means in aligned position as axial relative movement takes place in one direction when the tool is pressed barrel muzzle first against a workpiece, a helical spring surrounding said barrel member and operatively associated with said barrel member and housing resiliently biasing said barrel member relative to said housing in a direction opposite to said one direction so that the barrel member muzzle will extend beyond the housing a distance at least as great as the movement in said one direction, and manually actuatable means pivoted to said housing about an axis extending generally transverse to the direction of said relative axial movement and manually movable relative to said hand grip for moving said latching means to non-aligned position in firing pin cocked position for firing said tool by permitting said resilient bias of said firing pin to move said firing pin from cocked to fired position, said latching means including an element slidably mounted for reciprocating movement transverse to the direction of firing pin movement in said one member for movement between aligned and non-aligned positions and including a helical spring operatively associated with said element biasing said element to aligned position.

18. A powder actuated tool comprising a housing member, an extractor, said housing member and extractor being mounted for relative movement, a barrel member having a bore with a chamber for receiving a cartridge case, said barrel member and housing member being mounted for axial relative movement between an extraction normal first position and a firing second position wherein said housing member serves as the breech block for said chamber, corresponding portions on said members in said first and second positions being spaced apart at least the length of a cartridge case, means resiliently biasing said members toward said first position, said extractor engaging said cartridge case for holding said cartridge case stationary relative to said housing member for extraction when at least one of said members moves from said second position to said first position by the resilient bias.

19. A tool, as set forth in claim 18, including a resiliently biased firing pin, means responsive to relative movement from first to second positions for cocking said firing pin, means for firing said firing pin in said cocked position, and means operatively connecting said two last mentioned means and firing pin to said housing member.

20. A powder actuated tool comprising a barrel member, a housing member having a firing pin resiliently biased to move toward said barrel member, said barrel member having a bore with a chamber for receiving a cartridge case, said barrel member and housing member being mounted for axial relative movement between a safety normal first position and a ready-to-fire or firing second position wherein said housing member serves as the breech block for said chamber, said barrel member in said first position being spaced from while in said second position being adjacent said firing pin, means resiliently biasing said barrel member and said firing pin apart toward said first position, means on said barrel member for engaging and cocking said firing pin against the firing pin resilient bias as at least one of said members moves from said first to said second positions, and manual means for releasing said firing pin from said cocking means for firing said cartridge and propelling said fastener through said barrel member when said members are in said second position.

21. A tool, as set forth in claim 20, wherein said firing pin has a resiliently biased depressible pawl movable in a direction angularly disposed with the direction of firing pin movement between an extended position laterally extended from the remainder of said firing pin and a depressed position depressed into the remainder of said firing pin, said cocking means being an axially extending pin secured to said barrel member for engaging said pawl in said extended position and cocking said firing pin while causing it to become aligned with said manual release means during movement from said first to second position, said manual release means including a trigger and sear pivotally connected to said housing member about an axis extending generally transverse to the direction of firing pin movement with said sear aligned in said cocked position with said pawl for moving said pawl to said depressed position free of said pin secured to said barrel member for firing said tool.

References Cited in the file of this patent

UNITED STATES PATENTS

| Number | Name | Date |
|---|---|---|
| 291,980 | Budd | Jan. 15, 1884 |
| 398,595 | Emmens | Feb. 26, 1889 |
| 666,084 | Burgess | Jan. 15, 1901 |
| 693,106 | Burgess | Feb. 11, 1902 |
| 797,306 | Mossberg | Aug. 15, 1905 |
| 839,911 | Wesson | Jan. 1, 1907 |
| 886,211 | Hino | Apr. 28, 1908 |
| 1,337,444 | Douglas | Apr. 20, 1920 |
| 1,410,354 | White | Mar. 21, 1922 |
| 1,519,806 | Wesson | Dec. 16, 1924 |
| 2,045,333 | Pipes | June 23, 1936 |
| 2,096,002 | Mareira | Oct. 29, 1937 |
| 2,102,199 | Dixon | Dec. 14, 1937 |
| 2,316,112 | Temple | Apr. 6, 1943 |
| 2,329,273 | Kelly | Sept. 14, 1943 |
| 2,471,276 | Manville | May 24, 1949 |
| 2,507,364 | Benson | May 9, 1950 |
| 2,585,738 | Chapin | Feb. 12, 1952 |
| 2,590,862 | Hoppert | Apr. 1, 1952 |
| 2,659,994 | Yale | Nov. 24, 1953 |
| 2,679,645 | Erickson | June 1, 1954 |
| 2,701,931 | Polny | Feb. 15, 1955 |
| 2,719,300 | Walker | Oct. 4, 1955 |

FOREIGN PATENTS

| Number | Country | Date |
|---|---|---|
| 505,746 | Belgium | Sept. 29, 1951 |
| 510,186 | Belgium | Apr. 15, 1952 |